United States Patent
Shelest et al.

(10) Patent No.: US 9,003,048 B2
(45) Date of Patent: Apr. 7, 2015

(54) NETWORK ZONES

(75) Inventors: Art Shelest, Sammamish, WA (US); Richard B. Ward, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 994 days.

(21) Appl. No.: 10/405,972

(22) Filed: Apr. 1, 2003

(65) Prior Publication Data

US 2004/0199648 A1   Oct. 7, 2004

(51) Int. Cl.
  G06F 15/16   (2006.01)
  H04L 29/06   (2006.01)
  H04L 12/927  (2013.01)
  H04L 12/24   (2006.01)

(52) U.S. Cl.
  CPC .......... H04L 63/0227 (2013.01); *H04L 47/803* (2013.01); *H04L 41/0893* (2013.01); H04L 63/102 (2013.01)

(58) Field of Classification Search
  USPC ......... 709/218, 224–227, 229, 201, 202, 203, 709/217, 219, 220, 221, 222, 223, 228, 249, 709/250; 713/201; 726/3
  See application file for complete search history.

(56) References Cited

U.S. PATENT DOCUMENTS

| | | | | |
|---|---|---|---|---|
| 5,706,331 A * | 1/1998 | Wang et al. | ................. | 455/426.1 |
| 6,088,451 A * | 7/2000 | He et al. | ............................... | 726/8 |
| 6,161,139 A * | 12/2000 | Win et al. | ....................... | 709/225 |
| 6,198,920 B1 * | 3/2001 | Doviak et al. | .............. | 455/426.1 |
| 6,260,111 B1 * | 7/2001 | Craig et al. | .................... | 711/115 |
| 6,271,454 B1 * | 8/2001 | Tamura | ............................ | 84/603 |
| 6,301,613 B1 * | 10/2001 | Ahlstrom et al. | ............. | 709/223 |
| 6,321,334 B1 | 11/2001 | Jerger et al. | | |
| 6,366,912 B1 * | 4/2002 | Wallent et al. | ..................... | 707/9 |
| 6,385,724 B1 | 5/2002 | Beckman et al. | | |
| 6,408,336 B1 * | 6/2002 | Schneider et al. | ............ | 709/229 |
| 6,418,324 B1 * | 7/2002 | Doviak et al. | .............. | 455/426.1 |
| 6,473,800 B1 | 10/2002 | Jerger et al. | | |
| 6,479,739 B2 * | 11/2002 | Tamura | ............................ | 84/603 |

(Continued)

FOREIGN PATENT DOCUMENTS

| | | |
|---|---|---|
| CA | 2458771 | 5/2012 |
| JP | 2002108729 | 4/2002 |

(Continued)

OTHER PUBLICATIONS

McGraw, Gary, On Brick and Walls: Why Building Secure Software is Hard; pp. 229 through 238; Cigital, 21351 Ridgetop Circle, Ste. 400, Dulles, VA 20166.

(Continued)

*Primary Examiner* — Saket K Daftuar
(74) *Attorney, Agent, or Firm* — John Jardine; Kate Drakos; Micky Minhas (57) ABSTRACT

A computer assigns networks to network zones based on predefined properties for each zone and/or the properties of the networks. An application program installed on the computer provides the computer with preference information that indicates the network zone whose network policies or properties are best suited for the application program. Thereafter, when executing the application program, the computer limits network contact for the application program to the network(s) that is assigned to the network zone(s) identified as a preferred network zone(s) or identified by a preferred network property or properties by the preference information from the application program.

51 Claims, 7 Drawing Sheets

(56) References Cited

U.S. PATENT DOCUMENTS

| | | |
|---|---|---|
| 6,487,665 B1 | 11/2002 | Andrews et al. |
| 6,539,425 B1 * | 3/2003 | Stevens et al. ............... 709/220 |
| 6,678,828 B1 * | 1/2004 | Zhang et al. ..................... 726/2 |
| 6,697,806 B1 * | 2/2004 | Cook ............................. 707/10 |
| 6,766,165 B2 * | 7/2004 | Sharma et al. ............... 455/423 |
| 6,792,466 B1 * | 9/2004 | Saulpaugh et al. ........... 709/229 |
| 6,799,202 B1 * | 9/2004 | Hankinson et al. .......... 709/219 |
| 6,850,979 B1 * | 2/2005 | Saulpaugh et al. ........... 709/225 |
| 6,931,530 B2 * | 8/2005 | Pham et al. ................... 713/165 |
| 6,944,183 B1 * | 9/2005 | Iyer et al. ..................... 370/466 |
| 6,947,724 B2 * | 9/2005 | Chaney ......................... 455/408 |
| 6,957,258 B2 * | 10/2005 | Maher et al. ................. 709/224 |
| 6,982,962 B1 * | 1/2006 | Lunsford et al. ............. 370/278 |
| 7,032,022 B1 * | 4/2006 | Shanumgam et al. ........ 709/225 |
| 7,039,027 B2 * | 5/2006 | Bridgelall ..................... 370/329 |
| 7,039,037 B2 * | 5/2006 | Wang et al. ................... 370/349 |
| 7,058,796 B2 * | 6/2006 | Lynn et al. ........................ 713/1 |
| 7,086,089 B2 * | 8/2006 | Hrastar et al. .................. 726/22 |
| 7,116,970 B2 * | 10/2006 | Brusilovsky et al. ......... 455/411 |
| 7,546,629 B2 * | 6/2009 | Albert et al. ...................... 726/1 |
| 2002/0037731 A1 * | 3/2002 | Mao et al. ..................... 455/453 |
| 2002/0098843 A1 * | 7/2002 | Struhsaker .................... 455/444 |
| 2002/0120750 A1 * | 8/2002 | Nidd .............................. 709/227 |
| 2002/0136226 A1 * | 9/2002 | Christoffel et al. ........... 370/401 |
| 2002/0165949 A1 | 11/2002 | Na et al. |
| 2002/0166068 A1 * | 11/2002 | Kilgore ......................... 713/201 |
| 2003/0065816 A1 * | 4/2003 | Dharmadhikari et al. .... 709/240 |
| 2003/0126255 A1 * | 7/2003 | Rice et al. ..................... 709/224 |
| 2003/0142641 A1 * | 7/2003 | Sumner et al. ................ 370/328 |
| 2003/0145235 A1 * | 7/2003 | Choo ............................. 713/201 |
| 2003/0177389 A1 * | 9/2003 | Albert et al. .................. 713/201 |
| 2003/0204748 A1 * | 10/2003 | Chiu .............................. 713/201 |
| 2004/0010575 A1 * | 1/2004 | Wookey et al. ............... 709/223 |
| 2004/0015723 A1 * | 1/2004 | Pham et al. ................... 713/201 |
| 2004/0052232 A1 * | 3/2004 | Ramaswamy et al. ........ 370/338 |
| 2004/0066759 A1 * | 4/2004 | Molteni et al. ................ 370/329 |
| 2004/0077350 A1 * | 4/2004 | Naghian ........................ 455/440 |
| 2004/0088347 A1 * | 5/2004 | Yeager et al. ................. 709/202 |
| 2004/0123150 A1 * | 6/2004 | Wright et al. ................. 713/201 |
| 2004/0133687 A1 * | 7/2004 | Yamaguchi et al. .......... 709/228 |
| 2004/0205158 A1 * | 10/2004 | Hsu ............................... 709/218 |

FOREIGN PATENT DOCUMENTS

| | | |
|---|---|---|
| JP | 2003085059 | 3/2003 |
| MY | 138304 | 5/2009 |
| RU | 2169437 | 6/2001 |
| TW | 515168 | 12/2000 |
| TW | 502514 | 9/2002 |
| TW | 506203 | 10/2002 |
| WO | WO 99/48261 | 9/1999 |
| WO | WO/9948261 | 9/1999 |
| WO | WO/0150783 | 7/2001 |

OTHER PUBLICATIONS

McGraw, Gary, Building Secure Software: Better than Protecting Bad Software; Citigal.

Qingshi, et al.; A Novel Computer Architecture to Prevent Destruction by Viruses; J. Comput. Sci. & Technol., May 2002; vol. 17 No. 3, pp. 243 through 248.

"Decision on Grant", Application Serial No. 2004109906, (Jan. 23, 2009),26 pages.

"Foreign Office Action", Application Serial No. P 366534, (Nov. 18, 2009),8 pages.

"Foreign Office Action", Chinese Application No. 200410032356.X, (Jan. 8, 2010), 6 pages.

"Foreign Office Action", Polish Application No. P366534, (May 4, 2010),8 pages.

"Foreign Office Action", Canadian Application No. 2458771, (May 18, 2011),3 pages.

"Foreign Notice of Allowance", Canadian Application No. 2,458,771, (Feb. 8, 2012), 1 page.

"Foreign Office Action", Korean Application No. 10-2004-0022172, (Oct. 27, 2010),6 pages.

"Foreign Office Action", Taiwan Application No. 93105609, (Oct. 21, 2010), 1 page.

"Taiwan Search Report", Taiwan Application No. 093105609, (Oct. 21, 2010), 1 page.

"Foreign Office Action", Indian Application No. 371/DEL/2004, (Sep. 30, 2013),2 Pages.

* cited by examiner

Prior Art

NETWORK ZONES

TECHNICAL FIELD

The present disclosure generally relates to computer security, and more particularly, to controlling the exposure of computer applications and data to networks of varying properties by using predefined network zones.

BACKGROUND

The proliferation of mobile computing devices (e.g., laptop computers, cell phones, PDA's), and connectivity methods (e.g., Ethernet, Wi-Fi, cellular) introduces scenarios where a computing device may be attached to several networks of varying properties over the course of a day. For example, a businessman may use a laptop computer on a home network in the morning before going to work, and then use the same laptop computer later in the morning at work while connected to a corporate network. The same laptop computer might then be taken on a business trip later that afternoon where it could be connected to the Internet through a public Wi-Fi (short for "wireless fidelity") network, for example, at the airport. In addition to the possibility of being connected to several networks having different properties during different times in a day, such mobile computing devices are increasingly being connected to several different networks at the same time.

Exposure to certain network environments (e.g., the Internet) can pose particular risks for mobile computing devices when such devices are initially configured to operate in a particular, static network environment that is known to be safe (e.g., a home network environment protected by an Internet firewall). The ease of connecting mobile computer devices to various networks with differing properties increases the risk that such devices will encounter undesirable contacts in a hostile network environment.

Figure 1:
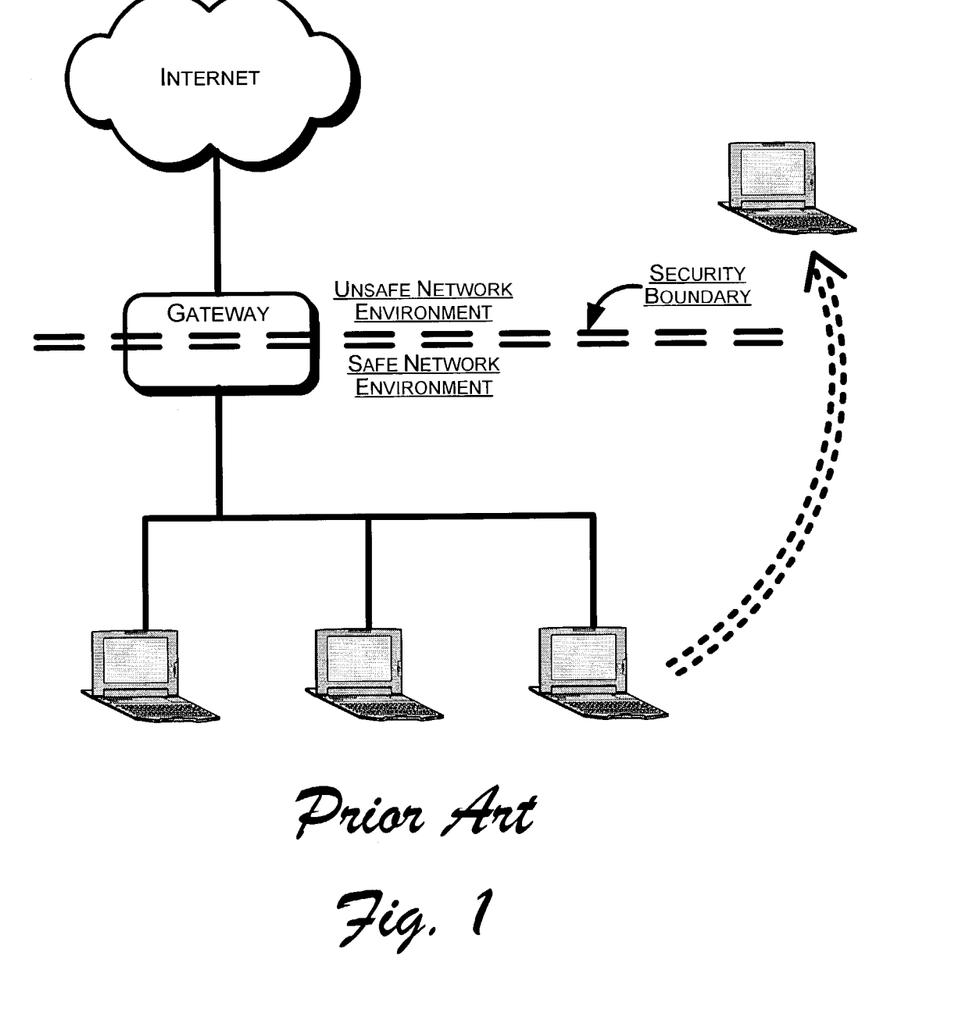
FIG. 1 illustrates a conventional network environment in accordance with the prior art.

Current methods for administering network security for such computers generally apply to the particular, static network to which the computers are connected. Network security configurations that protect computers on a static network (e.g., a home network) are generally implemented on an "interface" such as a firewall that is associated with only the static network. FIG. 1 illustrates a typical network environment in which a safe network environment (e.g., a home network) is separated from an unsafe network environment (e.g., the Internet) by a security boundary. The security boundary represents a firewall running on a gateway computer. The firewall may be configured to enforce particular policies designed to protect computers on the home network (i.e., safe network environment) from undesirable contact with devices on the Internet. Thus, while computers on the home network may be configured to share files freely, the firewall may be configured to refuse any external requests (i.e., from the Internet) for file sharing. This configuration can work well to protect computers in a static network environment where the firewall is properly configured.

However, security policies enforced by the firewall on the home network in the safe environment do not travel with a mobile computer when the mobile computer is removed from the home network environment and connected to the Internet, for example, through a public Wi-Fi network. The mobile computer is therefore subject to external file requests or attacks (e.g., file erasing) by other devices on the Internet unless the specific file sharing policies for the computer are manually adjusted each time the mobile computer is taken out of the home network environment. Various other scenarios and examples exist where applications and files on such mobile computers can be exposed to similar risks. The effectiveness of current methods for administering network security for such mobile computers is optimized only when the computers remain connected to the static network configured to provide a safe environment.

Accordingly, the need exists for a way to protect mobile computing devices that are connectable to various networks having varying properties.

SUMMARY

A system and methods are disclosed for controlling access to network connections according to network zones.

In one embodiment, an application program provides a preference that indicates a preferred network zone or zones. A connection is permitted between the application program and a network that is associated with the preferred network zone or zones. Connections between the application program and networks that are not associated with the preferred network zone or zones are prevented.

BRIEF DESCRIPTION OF THE DRAWINGS

The same reference numerals are used throughout the drawings to reference like components and features.

DETAILED DESCRIPTION

Overview

The following discussion is directed to systems and methods for controlling the exposure of various applications, services and data on a mobile computer to different networks that have varying network properties. A computer assigns a network to a network zone based on predefined properties for the zone and the properties of the network. A computer assigns networks to network zones based on predefined properties for each zone and/or the properties of the networks. An application program installed on the computer provides the computer with preference information that indicates a network zone whose network policies or properties are best suited for the application program. Thereafter, when executing the application program, the computer limits network contact for the application program to the network(s) assigned to the network zone(s) identified as a preferred network zone(s), or identified by a preferred network property or properties, by the preference information from the application program.

Benefits of the disclosed systems and methods include increased protection from potentially harmful network communication for a mobile computing device that connects to several different networks of varying properties throughout a period of time or at the same time. In addition, the need to configure security settings on such a mobile computer is reduced because the computer continually enforces the network zone(s) to which various applications and services have subscribed, regardless of the network or networks to which the computer is connected.

Exemplary Environment

Figure 2:
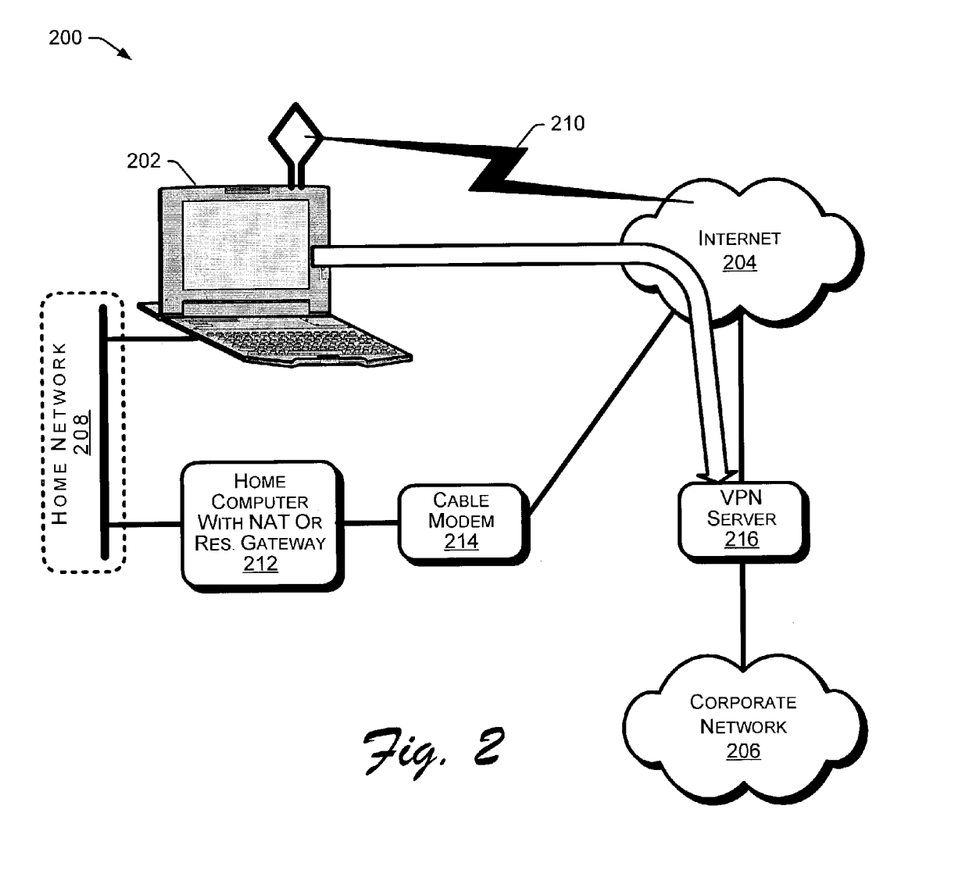
FIG. 2 illustrates an exemplary system environment suitable for implementing a mobile computing device enabled to control network communications through the employment and enforcement of network zones.

FIG. 2 shows an exemplary system environment 200 suitable for implementing one or more embodiments of a mobile computing device capable of controlling network communications through the employment and enforcement of network zones. The environment 200 typically includes a mobile computing device 202 (mobile computer) and one or more networks having varying properties such as, for example, the Internet 204, a corporate/enterprise network 206, and a home/residential network 208.

Mobile computer 202 may be implemented as various computing devices capable of being connected to various networks such as the Internet 204, a corporate network 206, and a home network 208. Thus, mobile computer 202 is typically a computing device that is physically mobile such as, for example, a laptop computer, a PDA (personal digital assistant), a cell phone and the like. However, there is no intent to limit mobile computer 202 to a physically mobile device, and therefore mobile computer 202 might include various other forms of personal computers (PC's). Certain implementations of mobile computer 202 typically perform common computing functions, such as email, calendaring, task organization, word processing, Web browsing, and so on. In the described embodiment, mobile computer 202 runs an open platform operating system, such as the Windows® brand operating systems from Microsoft®. One exemplary implementation of mobile computer 202 is described in more detail below with reference to FIG. 7.

Mobile computer 202 may employ various modes for connecting to one or more networks either at different times or at the same time. The exemplary system environment 200 of FIG. 2 is intended to illustrate examples of some of the ways in which a mobile computer 202 might connect to one or more networks. However, the environment 200 of FIG. 2 is not intended to indicate that the illustrated network connections are all necessary, nor is the environment 200 of FIG. 2 intended to indicate that mobile computer 202 is limited to the illustrated network connections.

Accordingly, mobile computer 202 is illustrated in the exemplary system environment 200 of FIG. 2 as being directly connected to the Internet 204 through a wireless connection 210 such as GPRS (General Packet Radio Service), UMTS (Universal Mobile Telecommunications System), WAP (Wireless Application Protocol), PCS (personal communications services) and the like. Mobile computer 202 is also illustrated as being indirectly connected to the Internet through home network 208, which may include a home computer 212 implementing NAT (Network Address Translator) or a dedicated Residential Gateway device. NAT is an Internet standard that enables a local-area network (LAN) to use one set of IP addresses for internal traffic and a second set of addresses for external traffic. A NAT box located where the LAN (e.g., home network 208) meets the Internet makes all necessary IP address translations. Cable modem 214 acts as the NAT host or gateway to home computer 212 and other clients such as mobile computer 202.

In the FIG. 2 environment 200, mobile computer 202 is illustrated as being directly connected to home network 208. However, home network 208 might also be a wireless local area network (WLAN), or Wi-Fi (short for "wireless fidelity") network, to which mobile computer 202 is connected through a wireless (radio) connection. In this respect, mobile computer 202 may connect indirectly to the Internet not only through a home Wi-Fi network such as home network 208, but also through any Wi-Fi network encountered in various common and public locations including, for example, a coffee shop, an international airport, and so on. Wi-Fi is specified in the 802.11b specification from the Institute of Electrical and Electronics Engineers (IEEE) and is part of a series of wireless specifications. As discussed above, home network 208 typically includes a home computer 212 with ICS and an Internet connection technology such as cable modem 214.

Mobile computer 202 is also shown in FIG. 2 as being indirectly connected to corporate network 206 through a VPN (virtual private network) server 216. VPNs are typically created using the Internet 204 as the medium for transporting data. Thus, various ways of connecting to the Internet, such as those discussed above, also apply to VPNs. VPN systems use encryption and other security mechanisms to ensure that authorized users access the network and that data cannot be intercepted.

The home network 208, corporate network 206, and Internet 204 illustrated in FIG. 2 are included as example networks in an exemplary system environment 200, and are generally well-known to those skilled in the art. These networks are also used as exemplary networks in the embodiments described herein below. There is no intent, however, to limit the number or configuration of other networks that may also be applicable to environment 200 and the exemplary embodiments discussed below.

Home network 208 typically includes two or more computers (e.g., home computer(s) 212, mobile computer 202) interconnected to form a local area network (LAN) within a home. A home network 208 allows computer owners to interconnect multiple computers so that each can share files, programs, printers, other peripheral devices, and Internet access (e.g., through a residential gateway) with other computers, reducing the need for redundant equipment. For example, an older computer without a CD-ROM drive can access a newer computer's CD-ROM, which may eliminate the need to purchase a CD-ROM for the older computer. Sharing files across a home network 208 is also easier than transferring files to various home computers using a portable storage medium such as a floppy disc. There are various types of home networks utilizing both wired connections and wireless connections. Such connections can include, for example, direct cable connections, traditional Ethernet, a phoneline network and an RF (radio frequency) network.

A corporate or enterprise network 206, often referred to as an intranet, is generally distinguishable from a home network 208 by its more general purpose, the types of devices that are interconnected, the use of communication protocols, and so on. For example, while a home network might interconnect personal computers and peripheral devices (e.g., a printer, a scanner) to form a LAN, and use a peer-to-peer communications protocol, a corporate network 206 might form a LAN through the interconnection of personal computers, work stations, servers, and peripheral devices while using a client/server architecture for communication. A corporate network 206 typically includes connections through one or more gateway computers to the outside Internet 204. Like home networks, corporate networks 206 may utilize both wired connections and wireless connections such as, for example, direct cable connections, traditional Ethernet, a phoneline network and an RF (radio frequency) network.

In general, the Internet 204 is a worldwide system of computer networks in which users at any first computer can get information from any second computer if the first computer has appropriate permission or if the second computer is not properly secure. The Internet 204 may be distinguished in general through its use of TCP/IP (Transmission Control Protocol/Internet Protocol) as its basic communication language or protocol. TCP/IP facilitates information sharing through the use of, for example, the World Wide Web which uses HTTP (Hypertext Transfer Protocol), e-mail which relies on SMTP (Simple Mail Transfer Protocol), Usenet news groups, instant messaging and FTP (File Transfer Protocol). These and other protocols are often packaged together with TCP/IP as a "suite".

As discussed in greater detail below, exemplary embodiments of the FIG. 2 environment 200 implement a mobile computer 202 configured to control communications and/or contacts between applications and services on mobile computer 202 and various networks (e.g., home network 208, corporate network 206, Internet 204) through the employment and enforcement of network zones. In general, controlling network communications in this manner protects mobile computer 202 and its various applications and data from potentially harmful contact initiated from an unknown and/or unsafe network environment such as the Internet 204.

Exemplary Embodiments

Figure 3:
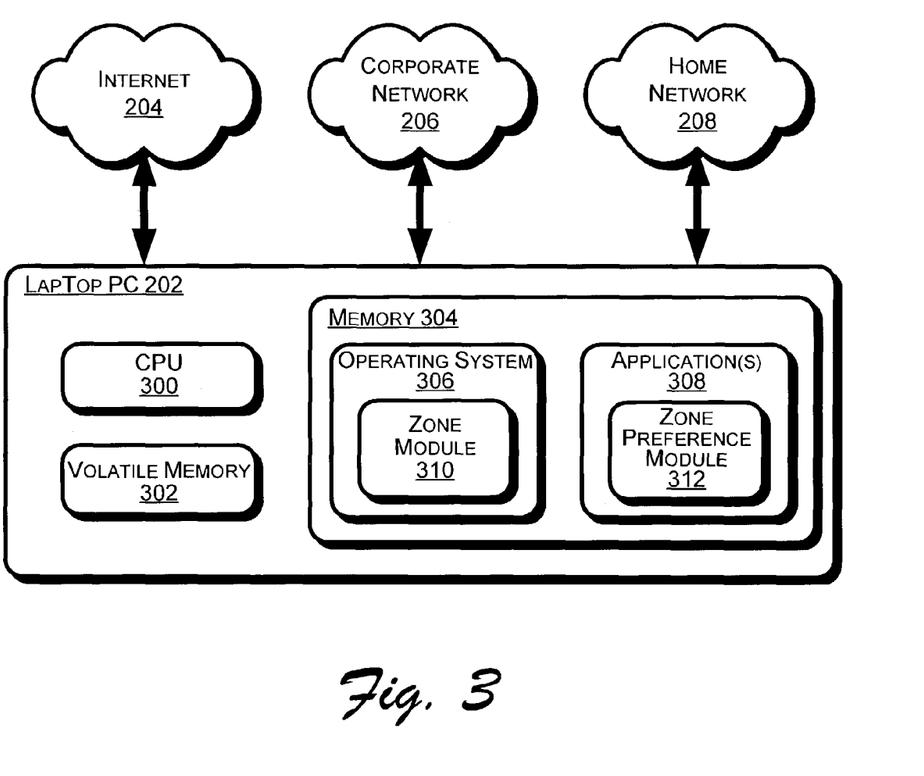
FIG. 3 is a block diagram of an exemplary mobile computer configured to control network communications through the employment and enforcement of network zones.

FIG. 3 is a block diagram representation of an exemplary embodiment of a mobile computer 202 configured to control communications between different networks having varying properties (e.g., Internet 204, corporate network 206, home network 208) and various application programs and data on a mobile computer 202. In general, the control of network contacts/communications is achieved through the employment and enforcement of network zones. Mobile computer 202 is implemented in the exemplary embodiment of FIG. 3 as a laptop PC (personal computer) 202.

Laptop PC 202 includes a processor 300, a volatile memory 302 (i.e., RAM), and a nonvolatile memory 304 (e.g., ROM, hard disk, floppy disk, CD-ROM, etc.). Nonvolatile memory 304 generally provides storage of computer/processor-readable instructions, data structures, program modules and other data for PC 202. One exemplary implementation of a laptop PC 202 is described in more detail below with reference to FIG. 7.

Laptop PC 202 implements an operating system (OS) 306 on processor 300 from volatile memory 302. The OS 306 is stored in memory 304 and initially loaded from memory 304 into volatile memory 302 by a boot program (not shown). The OS 306 is generally configured to manage other application programs 308 that are also stored in memory 304 and executable on processor 300 from volatile memory 302. The OS 306 honors requests for services made by application programs 308 through predefined application program interfaces (APIs). More specifically, the OS 306 typically determines the order in which multiple applications 308 execute on processor 300 and the execution time allotted for each application 308, manages the sharing of memory 302 among multiple applications 308, handles input and output to and from attached hardware devices (e.g., hard disks, printers, dial-up ports), and so on. In addition, users can typically interact directly with the OS 306 through a user interface such as a command language or graphical user interface.

Laptop PC 202 typically implements various application programs 308 stored in memory 304 and executable on processor 300. Such applications 308 might include software programs implementing, for example, word processors, spread sheets, browsers, file share programs, database management systems (DBMS), peer-to-peer applications, multimedia players, computer-aided design tools and the like.

In the FIG. 3 embodiment, the OS 306 on laptop PC 202 is illustrated as including a zone module 310, while application(s) 308 are illustrated as including a zone preference module 312. Zone module 310 is configured to support and/or define a number of network zones, each of which incorporates a set of network properties and policies that are consistent with particular networks to which the mobile laptop PC 202 might be connected. In the described embodiment of FIG. 3, the particular networks include the Internet 204, a corporate network 206, and a home network 208. However, as indicated above, the illustrated networks are not meant to limit the extent of any network that may be applicable to this and other embodiments.

Zone module 310 comprises a plurality of network zones that are distinguished from one another according to certain network properties and enforcement policies that each zone incorporates. When laptop PC 202 makes a network connection, zone module 310 determines the properties of the network and assigns the network to a particular network zone whose own incorporated properties correspond with the network properties. For example, when the laptop PC 202 is connected to a home network 208, the home network 208 will be assigned to a network zone that incorporates or embodies the properties of the home network 208. For a home network 208, the network properties might typically be associated with a network zone having more liberal securities polices, such as policies that would permit file sharing without the need for a password, for example. In general, and as discussed below with respect to FIGS. 4 and 5, each network zone being supported by zone module 310 has a single network associated with it or assigned to it.

In addition to determining network properties for networks connected to laptop PC 202 and assigning networks to appropriate network zones according to the network properties, the zone module 310 also assigns applications 308 to particular network zones according to zone preferences that are indicated by the applications 308. Therefore, as shown in FIG. 4, an application 308 is assigned to a particular network zone 400 based on a network zone preference provided to the zone module 310 by the application 308.

Figure 4:
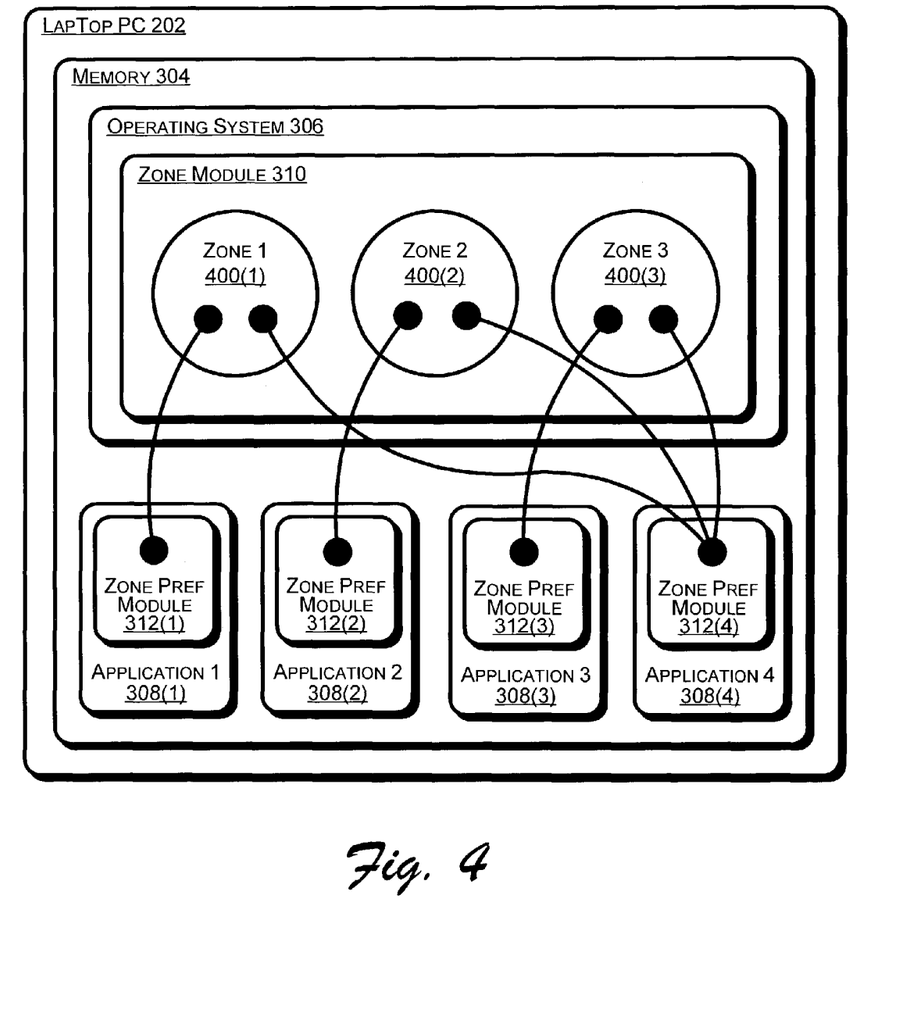
FIG. 4 is a partial block diagram illustrating features of the exemplary mobile computer of FIG. 3 in more detail.

More particularly, FIG. 4 demonstrates the concept of assigning an application 308 to a network zone 400 by showing how four different applications 308(1-4) on PC 202 are assigned to three different network zones 400 (i.e., zone 1, 400(1); zone 2, 400(2); zone 3, 400(3)) being supported by zone module 310. FIG. 4 is intended, in part, to illustrate how an application 308 can be assigned to a single network zone 400 or to numerous network zones 400 simultaneously. Thus, while application 1 (308(1)), application 2 (308(2)), and application 3 (308(3)), are assigned to zone 1 (400(1)), zone 2 (400(2)), and zone 3 (400(3)), respectively, application 4 (308(4)) is assigned to all three zones 400(1,2,3) simultaneously. It is noted that, while FIG. 4 and FIG. 5 (discussed below) and their accompanying discussion indicate a zone module 310 that supports three zones 400 (i.e., zone 1, 400 (1); zone 2, 400(2); zone 3, 400(3)), there is no intent to limit the number of zones 400 to three zones. Thus, zone module 310 may support additional zones 400, with each zone 400 being associated with a particular network that is connected or connectable to laptop PC 202.

Applications 308 communicate their preference for a network zone 400 or network zones through a zone preference module 312. The zone preference module 312 is typically embedded or programmed with the zone preference information at the time the application 308 is designed. Thus, upon installation of an application 308 onto laptop PC 202, the zone preference module 312 can communicate the zone preference information to the zone module 310 of OS 306. However, the zone preference module 312 might also enable a user to indicate a zone preference. Under such a scenario, during the installation of an application 308 onto laptop PC 202 a zone preference module 312 may generate a user interface (e.g., a graphical user interface or command line interface) on the PC 202 through which a user can specify one or more network zone preferences for the application 308. The zone preference(s) are then communicated to the zone module 310 of OS 306.

Once the zone module 310 has assigned an application 308 to a network zone 400 according to the network zone preference received from the application 308, the zone module 310 thereafter enforces the policies of the zone 400 with respect to that application 308. Thus, the zone module 310 limits network contact for an application 308 to only that network (or networks) associated with the network zone (or zones) that the application 308 has specified as a preferred network zone (or zones). The laptop PC 202 may be connected to various networks at the same time, and yet, an application 308 running on the PC 202 is only allowed to "see", or communicate with, those networks associated with the application's 308 preferred network zones 400.

In another embodiment, an application 308 can communicate a custom network connection policy through zone preference module 312. In this embodiment, the zone preference module 312 is embedded/programmed with specific communication instructions that define the network connections for the application 308. The instructions may include, for example, specific locations on the Internet with which the application 308 can communicate. Thus, upon installation of the application 308 onto laptop PC 202, the zone preference module 312 communicates the instructions to the zone module 310 of OS 306. The zone module 310 uses the instructions to effectively define a custom zone, and then assigns the application 308 to that zone. Thereafter, the zone module 310 enforces the policies of the custom zone according to the specific instructions received from the application 308. Enforcement typically includes limiting network contact for the application 308 to the network locations expressed in the instructions received from the application 308. Therefore, although the laptop PC 202 may be connected to various networks at the same time and access various network locations, the application 308 is only allowed to "see", or communicate with, those network locations expressed in the instructions received from the application 308.

Figure 5:
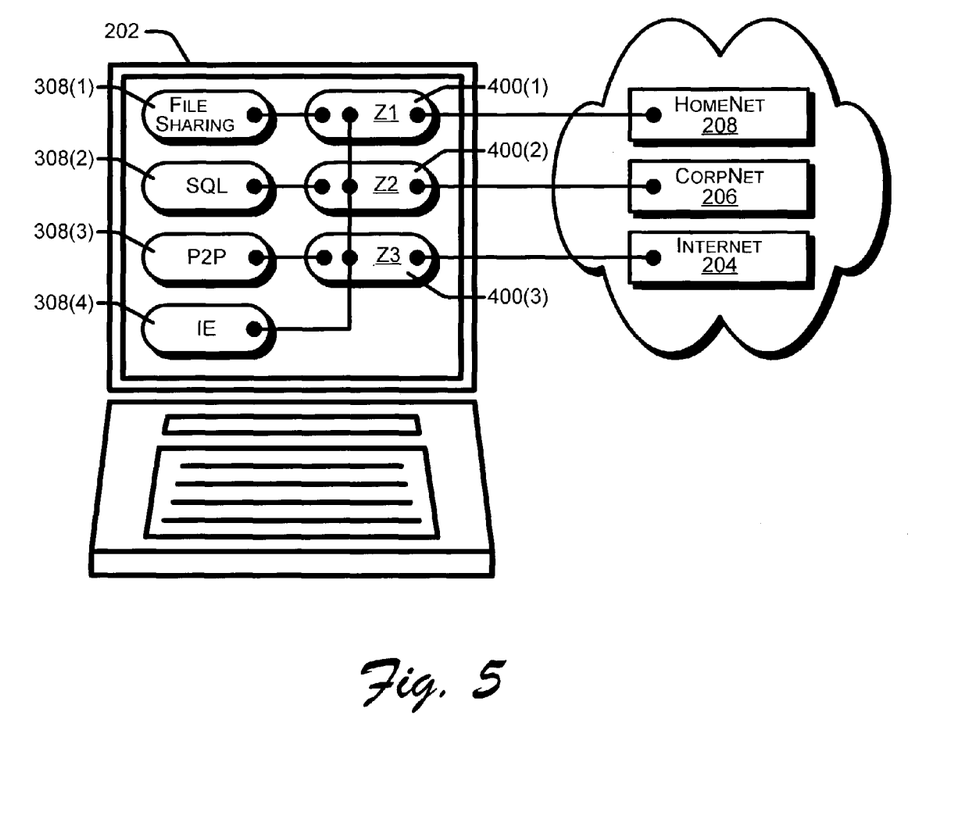
FIG. 5 illustrates a particular functional example of an exemplary mobile computer such as that shown in FIG. 3.

FIG. 5 illustrates a more specific example of how network zones 400 implemented in an embodiment such as that described above may be used to control communications between applications 308 running on a mobile laptop PC 202 and various networks connected to the PC 202. The illustration of FIG. 5 is intended to indicate that the laptop PC 202 is connected to three networks of varying properties at the same time. The networks to which the PC 202 is connected are a home network 208, a corporate network 206, and the Internet 204. Each network has been assigned (i.e., through the zone module 310) to, or associated with, a particular network zone 400 based on the network's properties. Thus, home network 208 has been assigned to zone 1 (400(1)), corporate network 206 has been assigned to zone 2 (400(2)), and the Internet 204 has been assigned to zone 3 (400(3)). Applications 308 that specify a particular zone 400 as a preferred zone will be subject to the policies of that particular zone 400.

The applications 308 represented on laptop PC 202 in FIG. 5 include a file sharing application 308(1), a SQL server application 308(2), a peer-to-peer (P2P) application 308(3), and a browser (e.g., Internet Explorer) application 308(4). Each application 308 has provided (e.g., during installation onto PC 202) the zone module 310 (FIGS. 3 and 4) with preference information indicating to which zone (or zones) 400 the application 308 should be assigned. Thus, the file sharing application 308(1) is assigned to zone 1 (400(1)), the SQL server application 308(2) is assigned to zone 2 (400(2)), the P2P application 308(3) is assigned to zone 3 (400(3)), and the browser application 308(4) is assigned to zones 1, 2, and 3.

An application 308 specifies particular network zones 400 as preferred zones based on the particular functionality of the application 308. For example, a file sharing application 308(1) typically allows a number of people on a network to use the same file or files through some combination of being able to read or view the file(s), write to or modify the file(s), copy the file(s), or print the file(s). Thus, if a user on a first computer chooses to share files, then a user on a second computer can access the shared files. The operation of such file sharing applications 308(1) generally presumes that there is no hostile intent posed by various computers that want to share files. Thus, such file sharing applications 308(1) typically specify a network zone 400 that is consistent with this presumption.

In the FIG. 5 illustration, zone 1 (400(1)) provides a network environment (i.e., home network 208) whose properties are consistent with the intended functionality of file sharing application 308(1). Regardless of any other network connections to laptop PC 202, the zone module 310 on laptop PC 202 enforces the network zone 1 (400(1)) such that file sharing application 308(1) "sees" only the connection to the home network 208. Enforcement of zone 1 (400(1)) by zone module 310 essentially blocks any communication between file sharing application 308(1) and any network connected to PC 202 that is not a home network 208.

In a similar manner, other applications such as applications 308(2), 308(3), and 308(4) specify particular network zones 400 as preferred zones based on the particular functionality of the applications 308. A SQL server application 308(2) is an application that is designed to function in a corporate/enterprise environment, and therefore it typically specifies a network zone 400 consistent with its functional purpose. Accordingly, the SQL server application 308(2) illustrated in FIG. 5 has indicated zone 2 (400(2)) as its preferred zone, and the zone module 310 on laptop PC 202 enforces zone 2 (400(2)) such that the SQL application 308(2) "sees" only the connection to the corporate network 206, regardless of what other network connections might exist on laptop PC 202. A P2P application 308(3) is designed to function in an Internet only environment, and therefore typically specifies a network zone 400 consistent with this functional purpose. Accordingly, the P2P application 308(3) of FIG. 5 has indicated zone 3 (400(3)) as its preferred zone because zone 3 supports and enforces the Internet as its only network connection. Thus, the zone module 310 on laptop PC 202 ensures that the P2P application 308(3) will "see" only the connection to the Internet 204, regardless of what other network connections might exist on laptop PC 202.

The browser application 308(4) has likewise, specified particular network zones 400 as preferred zones based on the particular functionality of a browser application 308(4). Browsers are applications that are generally designed to function in all network environments, and they provide their own set of security settings. Accordingly, the browser application 308(4) of FIG. 5 has specified all three network zones 400

(1-3) as preferred zones. Thus, the zone module 310 on laptop PC 202 ensures that the browser application 308(4) is able to "see" all the network connections to the laptop PC 202.

Exemplary Methods

Example methods for implementing one or more embodiments of a mobile computer 202 configured to control communications between different networks having varying properties and various application programs and data on the computer 202 will now be described with primary reference to the flow diagram of FIG. 6. The methods apply generally to the exemplary embodiments discussed above with respect to FIGS. 3-5. The elements of the described methods may be performed by any appropriate means including, for example, by the execution of processor-readable instructions defined on a processor-readable medium.

A "processor-readable medium" as used herein, can be any means that can contain, store, communicate, propagate, or transport instructions for use by or execution by a processor. A processor-readable medium can be, without limitation, an electronic, magnetic, optical, electromagnetic, infrared, or semiconductor system, apparatus, device, or propagation medium. More specific examples of a processor-readable medium include, among others, an electrical connection having one or more wires, a portable computer diskette, a random access memory (RAM), a read-only memory (ROM), an erasable programmable-read-only memory (EPROM or Flash memory), an optical fiber, and a portable compact disc read-only memory (CDROM).

Figure 6:
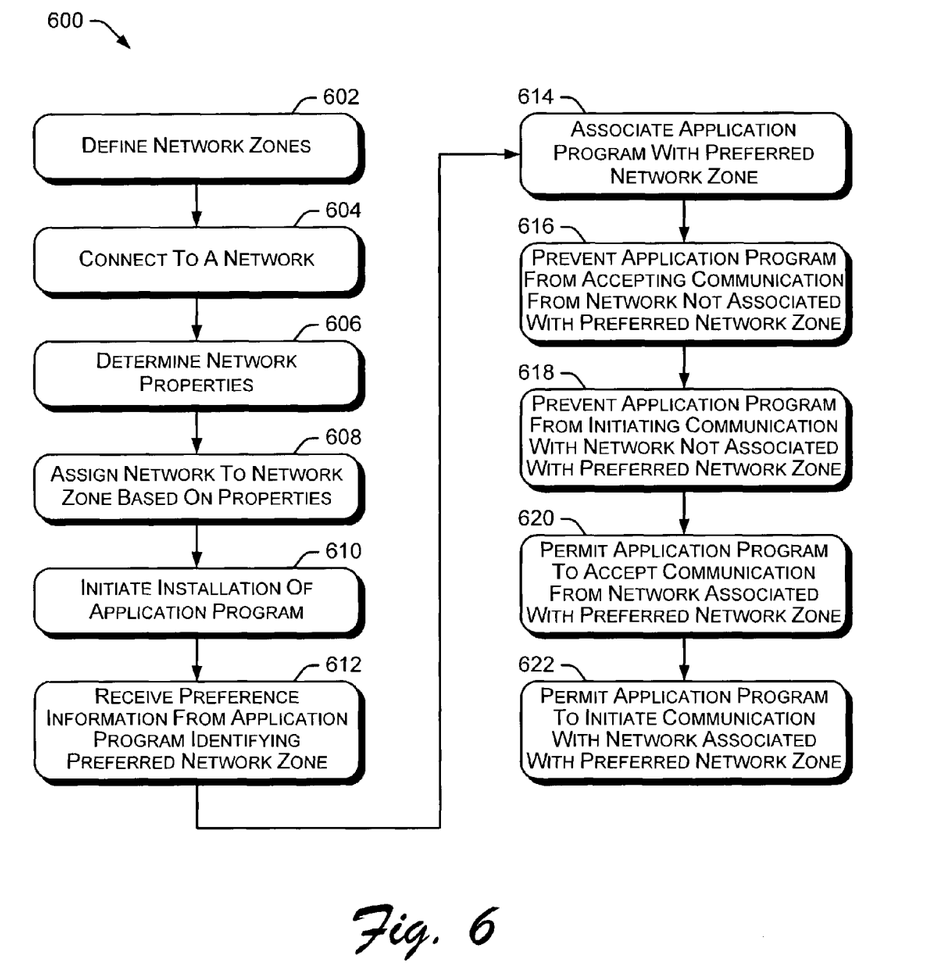
FIG. 6 is a flow diagram illustrating an exemplary method for implementing an embodiment of a mobile computer such as that shown in FIG. 3.

FIG. 6 shows an exemplary method 600 for implementing an embodiment of a mobile computer 202 configured to control communications between networks having varying properties and application programs and data on the mobile computer 202. At block 602, network zones are defined. A mobile computer 202 defines a plurality of network zones based on network properties and network communication/connection policies. Custom zones, whose properties and/or policies will be determined based on instructions from an application program 308, may also be included as network zones.

At block 604, the computer 202 connects to a network. The network may be any sort of network including, for example, a home network 208, a corporate network 206, and the Internet 204. At block 606, the computer 202 determines the properties of the network, and at block 608, it assigns the network to a network zone according to the network properties. The network is assigned to a network zone whose properties are consistent with the properties determined for the network.

At block 610, the computer 202 initiates the installation of an application program 308. At block 612, the computer 202 receives preference information from the application 308 being installed that indicates a preferred network zone for the application. In one embodiment, the preference information may include communication instructions that define the properties and connection policies for a custom zone. In another embodiment, the preference information may simply include one or more properties preferred by the application 308. At block 614, the computer 202 associates/assigns the application 308 to a network zone based on the preference information from the application 308. Depending on the preference information, the network zone (or zones) may be a network zone specified as the application's preferred network zone, it may be a custom zone defined by the preference information, or it may be a network zone that includes one or more networks which possess one or properties included in the preference information from the application 308.

Thereafter, the computer 202 enforces the network zone with which the application is associated in several ways. At block 616, the computer 202 prevents the application program 308 from seeing and/or accepting communication from a network that is not associated with the preferred network zone. For custom zones, this may include preventing the application program 308 from accepting communication from network locations not specified in the custom zone. At block 618, the computer 202 prevents the application program 308 from seeing and/or initiating communication with a network not associated with the preferred network zone. For custom zones, this may include preventing the application program 308 from initiating communication with any network location not specified in the custom zone.

At block 620, the computer 202 permits the application program to accept communication from the network associated with the preferred network zone. For custom zones, this may include permitting the application program 308 to accept communication from network locations specified in the custom zone. At block 622, the computer 202 permits the application program to initiate communication with the network associated with preferred network zone. For custom zones, this may include permitting the application program to initiate communication with network locations specified in the custom zone.

While one or more methods have been disclosed by means of flow diagrams and text associated with the blocks of the flow diagrams, it is to be understood that the blocks do not necessarily have to be performed in the order in which they were presented, and that an alternative order may result in similar advantages. Furthermore, the methods are not exclusive and can be performed alone or in combination with one another.

Exemplary Computer

Figure 7:
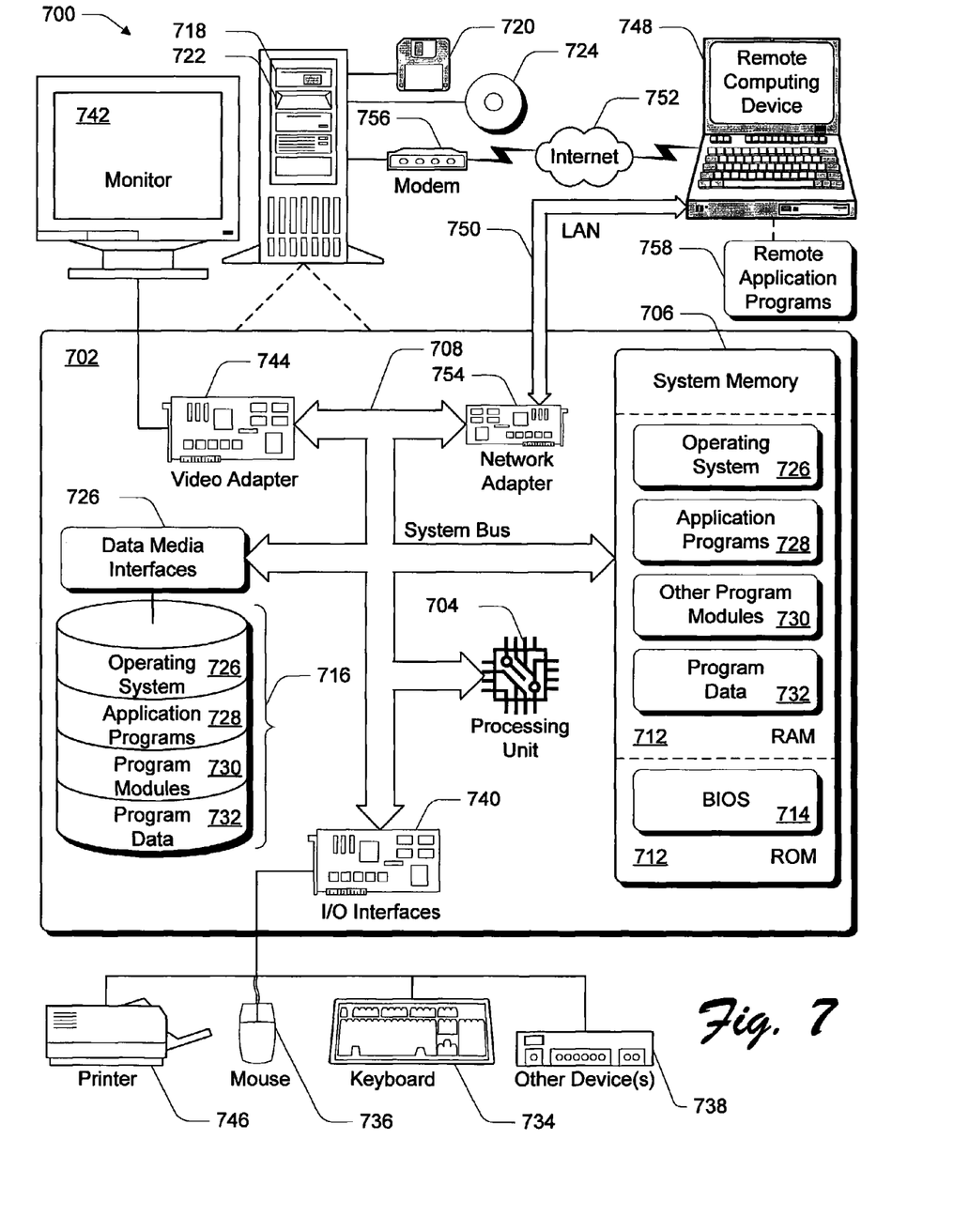
FIG. 7 illustrates an exemplary computing environment that is suitable for implementing a mobile computer such as that shown in FIG. 3.

FIG. 7 illustrates an example of a suitable computing environment 700 that may be used to implement a mobile computer 202. Although one specific configuration is shown, computer 202 may be implemented in other computing configurations.

The computing environment 700 includes a general-purpose computing system in the form of a computer 702. The components of computer 702 can include, but are not limited to, one or more processors or processing units 704, a system memory 706, and a system bus 708 that couples various system components including the processor 704 to the system memory 706.

The system bus 708 represents one or more of any of several types of bus structures, including a memory bus or memory controller, a peripheral bus, an accelerated graphics port, and a processor or local bus using any of a variety of bus architectures. An example of a system bus 708 would be a Peripheral Component Interconnects (PCI) bus, also known as a Mezzanine bus.

Computer 702, typically includes a variety of computer readable media. Such media can be any available media that is accessible by computer 702 and includes both volatile and non-volatile media, removable and non-removable media. The system memory 706 includes computer readable media in the form of volatile memory, such as random access memory (RAM) 710, and/or non-volatile memory, such as read only memory (ROM) 712. A basic input/output system (BIOS) 714, containing the basic routines that help to transfer information between elements within computer 702, such as during start-up, is stored in ROM 712. RAM 710 typically contains data and/or program modules that are immediately accessible to and/or presently operated on by the processing unit 704.

Computer 702 can also include other removable/non-removable, volatile/non-volatile computer storage media. By way of example, FIG. 7 illustrates a hard disk drive 716 for reading from and writing to a non-removable, non-volatile magnetic media (not shown), a magnetic disk drive 718 for reading from and writing to a removable, non-volatile magnetic disk 720 (e.g., a "floppy disk"), and an optical disk drive 722 for reading from and/or writing to a removable, non-volatile optical disk 724 such as a CD-ROM, DVD-ROM, or other optical media. The hard disk drive 716, magnetic disk drive 718, and optical disk drive 722 are each connected to the system bus 708 by one or more data media interfaces 726. Alternatively, the hard disk drive 716, magnetic disk drive 718, and optical disk drive 722 can be connected to the system bus 708 by a SCSI interface (not shown).

The disk drives and their associated computer-readable media provide non-volatile storage of computer readable instructions, data structures, program modules, and other data for computer 702. Although the example illustrates a hard disk 716, a removable magnetic disk 720, and a removable optical disk 724, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 716, magnetic disk 720, optical disk 724, ROM 712, and/or RAM 710, including by way of example, an operating system 726, one or more application programs 728, other program modules 730, and program data 732. Each of such operating system 726, one or more application programs 728, other program modules 730, and program data 732 (or some combination thereof) may include an embodiment of a caching scheme for user network access information.

Computer 702 can include a variety of computer/processor readable media identified as communication media. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

A user can enter commands and information into computer system 702 via input devices such as a keyboard 734 and a pointing device 736 (e.g., a "mouse"). Other input devices 738 (not shown specifically) may include a microphone, joystick, game pad, satellite dish, serial port, scanner, and/or the like. These and other input devices are connected to the processing unit 704 via input/output interfaces 740 that are coupled to the system bus 708, but may be connected by other interface and bus structures, such as a parallel port, game port, or a universal serial bus (USB).

A monitor 742 or other type of display device can also be connected to the system bus 708 via an interface, such as a video adapter 744. In addition to the monitor 742, other output peripheral devices can include components such as speakers (not shown) and a printer 746 which can be connected to computer 702 via the input/output interfaces 740.

Computer 702 can operate in a networked environment using logical connections to one or more remote computers, such as a remote computing device 748. By way of example, the remote computing device 748 can be a personal computer, portable computer, a server, a router, a network computer, a peer device or other common network node, and the like. The remote computing device 748 is illustrated as a portable computer that can include many or all of the elements and features described herein relative to computer system 702.

Logical connections between computer 702 and the remote computer 748 are depicted as a local area network (LAN) 750 and a general wide area network (WAN) 752. Such networking environments are commonplace in offices, enterprise-wide computer networks, intranets, and the Internet. When implemented in a LAN networking environment, the computer 702 is connected to a local network 750 via a network interface or adapter 754. When implemented in a WAN networking environment, the computer 702 typically includes a modem 756 or other means for establishing communications over the wide network 752. The modem 756, which can be internal or external to computer 702, can be connected to the system bus 708 via the input/output interfaces 740 or other appropriate mechanisms. It is to be appreciated that the illustrated network connections are exemplary and that other means of establishing communication link(s) between the computers 702 and 748 can be employed.

In a networked environment, such as that illustrated with computing environment 700, program modules depicted relative to the computer 702, or portions thereof, may be stored in a remote memory storage device. By way of example, remote application programs 758 reside on a memory device of remote computer 748. For purposes of illustration, application programs and other executable program components, such as the operating system, are illustrated herein as discrete blocks, although it is recognized that such programs and components reside at various times in different storage components of the computer system 702, and are executed by the data processor(s) of the computer.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A processor-readable storage memory having stored thereon processor-executable instructions that, responsive to execution by a client computer, cause the client computer to perform a method comprising:
  defining by a module locally at the client computer a plurality of network zones each of which includes a different set of network properties and connection policies to associate networks encountered by the client computer with one of the plurality of network zones, the plurality of network zones configured to be enforced by the module to control connections of the client computer to the encountered networks;
  connecting to at least one of the encountered networks;
  subsequent to the connecting, assigning the at least one of the encountered networks to one of the plurality of network zones that has network properties corresponding to properties of the at least one of the encountered networks;

receiving, from an application program executing on the computer, preference information that identifies one of the plurality of network zones as a preferred network zone;

permitting communications between the application program and a network connected to the client computer that is assigned to the preferred network zone, the application program being permitted to communicate with specific network locations on the network that are defined by the preference information received from the application program; and preventing communications between the application program and a network connected to the client computer that is not assigned to the preferred network zone, the application program being prevented from communicating with network locations on the network that are not specified in the preferred network zone.

2. A processor-readable storage memory as recited in claim 1, comprising further processor-executable instructions configured for:

detecting an additional network available to the client computer; and associating the additional network with an additional network zone.

3. A processor-readable storage memory as recited in claim 2, wherein the associating further comprises:

comparing network properties of the additional network with properties of each network zone; and based on the comparison, associating the additional network with the preferred network zone.

4. A processor-readable storage memory as recited in claim 2, wherein the associating further comprises:

connecting to the additional network;

determining network properties of the additional network; and assigning the additional network to the at least one network zone based on the network properties.

5. A processor-readable storage memory as recited in claim 1, comprising further processor-executable instructions configured for associating the application program with the preferred network zone.

6. A processor-readable storage memory as recited in claim 1, wherein the receiving further comprises initiating an installation of the application program.

7. A processor-readable storage memory as recited in claim 1, wherein the permitting a connection further comprises:

allowing the application program to accept a communication from the network assigned to the preferred network zone; and allowing the application program to initiate a communication to the network assigned to the preferred network zone.

8. A processor-readable storage memory as recited in claim 1, wherein the preventing a connection further comprises:

preventing the application program from accepting a communication from the network that is connected to the client computer and which is not assigned to the preferred network zone; and preventing the application program from initiating a communication to the network not assigned to the preferred network zone.

9. A processor-readable storage memory as recited in claim 2, wherein each network zone is assigned a different network.

10. A processor-readable storage memory as recited in claim 2, wherein each network zone is assigned a network selected from the group comprising:

a home network;
a corporate network; and
the Internet.

11. A processor-readable storage memory as recited in claim 1, wherein the preference information comprises a preferred network property used to identify the preferred network zone based on a network that possesses the preferred network property.

12. A processor-readable storage memory as recited in claim 1, wherein the preference information comprises properties and connection policies that define the preferred network zone as a custom zone.

13. A processor-readable storage memory having stored thereon processor-executable instructions that, responsive to execution by a client computer, cause the client computer to perform a method comprising:

defining via a zone module of an operating system of the client computer a plurality of network zones each of which includes a set of network properties and policies to associate networks encountered by the client computer with one of the plurality of network zones, the plurality of network zones configured to be enforced by the zone module locally at the client computer to control connections of the client computer to the encountered networks;

recognizing a connection between the client computer and a first network;

based on recognition of the connection, assigning the first network to a first network zone;

permitting access to the first network for application programs that specify the first network zone as a preferred network zone, the application programs being permitted to communicate with network locations on the first network that are specified in the first network zone;

preventing the application programs from communicating with one or more network locations on the first network that are not specified in the first network zone; and preventing access to the first network connected to the client computer for additional application programs that specify a second network zone as a preferred network zone.

14. A processor-readable storage memory as recited in claim 13, wherein the associating further comprises:

determining network properties of the first network; and assigning the first network to the first network zone based on the network properties.

15. A processor-readable storage memory as recited in claim 13, comprising further processor-executable instructions configured for:

recognizing a connection between the client computer and a second network;

assigning the second network to the second network zone;

permitting access to the second network for application programs that specify the second network zone as a preferred network zone; and preventing access to the second network connected to the client computer for application programs that specify the first network zone as a preferred network zone.

16. A processor-readable storage memory as recited in claim 15, comprising further processor-executable instructions configured for:

permitting access to the first network and the second network for application programs that specify the first network zone and the second network zone as preferred network zones.

17. A processor-readable storage memory as recited in claim 13, wherein the first network connection is selected from the group comprising:
- a home network connection;
- a corporate network connection; and
- an Internet connection.

18. A processor-readable storage memory having stored thereon processor-executable instructions that, responsive to execution by a client computer, cause the client computer to perform a method comprising:
- defining via a software module integrated with the client computer a plurality of network zones such that each network zone corresponds to a different network connection policy and includes a set of network properties to assign networks encountered by the client computer with the plurality of network zones, the plurality of network zones configured to be enforced by the software module locally at the client computer to control connections of the client computer to the encountered networks;
- connecting to at least one of the networks encountered by the client computer;
- responsive to the connecting, assigning the at least one of the networks to one of the plurality of network zones that has network properties corresponding to properties of the at least one of the networks;
- receiving a network zone preference from an application program executed at the client computer indicating a preferred network connection policy for the application program; and
- based upon the network connection policy and network properties of each network zone, enforcing the preferred network connection policy according to the network zone preference during execution of the application program to control communication of the application program with networks to which the client computer is connected, the communication being controlled by at least limiting network contact for the application to communications with particular network locations that are expressed in the preferred network connection policy received from the application program, the application program being prevented from communicating with networks connected to the client computer that are not associated with a network zone that corresponds to the network zone preference, the application program being prevented from communicating with network locations that are not specified in the preferred network connection policy.

19. A processor-readable storage memory as recited in claim 18, wherein the preferred network connection policy is a custom network connection policy, the processor-readable medium comprising further processor-executable instructions configured for:
- receiving instructions from the application program that define the custom network connection policy; and
- enforcing the custom network connection policy according to the instructions during execution of the application program.

20. A method implemented at least in part by a mobile computer comprising:
- defining in a module integrated with an operating system of the mobile computer a plurality of network zones each of which includes a set of network properties and policies to associate networks encountered by the mobile computer with the plurality of network zones;
- receiving from an application program executing on the mobile computer, a preference that specifies a preferred network zone of the plurality of network zones;
- assigning the application program to the preferred network zone via the module integrated with the operating system in accordance with the preference;
- detecting a connection between the mobile computer and a network;
- comparing network properties of the connected network with properties of each network zone;
- based on the comparison, assigning the connected network to the preferred network zone; and
- based on the assigning of the application program to the preferred network zone:
  - permitting one or more communications between the application program and the network assigned to the preferred network zone, the application program being permitted to communicate with particular network locations on the network that are defined by instructions received from the application program; and
  - preventing one or more communications between the application program and another network connected to the mobile computer that is not assigned to the preferred network zone, the application program being prevented from communicating with network locations on the network that are not specified in the preferred network zone.

21. A method as recited in claim 20, wherein the receiving further comprises initiating an installation of the application program.

22. A method as recited in claim 20, wherein the permitting one or more communications further comprises:
- allowing the application program to accept a communication from the network assigned to the preferred network zone; and
- allowing the application program to initiate a communication to the network assigned to the preferred network zone.

23. A method as recited in claim 20, wherein the preventing one or more communications further comprises:
- preventing the application program from accepting a communication from the other network connected to the mobile computer that is not associated with the preferred network zone; and
- preventing the application program from initiating a communication to the other network connected to the mobile computer that is not associated with the preferred network zone.

24. A method as recited in claim 20, wherein each network zone is assigned a different network.

25. A method as recited in claim 20, wherein each network zone is assigned a network selected from the group comprising:
- a home network;
- a corporate network; and
- the Internet.

26. A method implemented at least in part by a mobile computer comprising:
- defining by a module integrated with an operating system of the mobile computer a plurality of network zones each of which includes a set of network properties and policies to associate networks encountered by the mobile computer with the plurality of network zones;
- recognizing a connection between the mobile computer and a first network;

based on the connection, assigning the first network to a first network zone;

permitting access to the first network for application programs that specify the first network zone as a preferred network zone, the application programs being permitted to communicate with network locations on the first network that are specified in the first network zone;

preventing the application programs from communicating with one or more network locations on the first network that are not specified in the first network zone; and preventing access to the first network connected to the mobile computer for additional application programs that specify a second network zone as a preferred network zone.

27. A method as recited in claim 26, wherein the associating further comprises:

determining network properties of the first network; and assigning the first network to the first network zone based on the network properties.

28. A method as recited in claim 26, further comprising:

recognizing a connection between the mobile computer and a second network;

assigning the second network to the second network zone;

permitting access to the second network for application programs that specify the second network zone as a preferred network zone; and preventing access to the second network for application programs that do not specify the second network zone as the preferred network zone.

29. A method as recited in claim 28, further comprising:

permitting access to the first network and the second network for application programs that specify the first network zone and the second network zone as preferred network zones.

30. A method as recited in claim 26, wherein the first network connection is selected from the group comprising:

a home network connection;

a corporate network connection; and an Internet connection.

31. A method comprising:

defining in an operating system module of a client computer a plurality of network zones such that each network zone corresponds to a different network connection policy and includes a set of network properties to associate networks encountered by the client computer with the plurality of network zones;

connecting the client computer to at least one encountered network;

responsive to the connecting, assigning the at least one encountered network to one of the plurality of network zones that has network properties corresponding to properties of the at least one encountered network;

receiving a network zone preference from an application program executed at the client computer indicating a preferred network connection policy for the application program; and based upon the network connection policy and network properties of each network zone, enforcing the preferred network connection policy according to the network zone preference during execution of the application program to control communication of the application program with networks to which the computer is connected, the communication being controlled by at least limiting communications between the application and specific network locations on the at least on encountered network that are specified in the network zone preference received from the application program, the application program being prevented from communicating with networks connected to the client computer that are not associated with a network zone that corresponds to the network zone preference, the application program being prevented from communicating with network locations on the at least one encountered network that are not specified in the network zone preference received from the application program.

32. A method as recited in claim 31, wherein the preferred network connection policy is a custom network connection policy, the method further comprising:

receiving instructions from the application program that define the custom network connection policy; and enforcing the custom network connection policy according to the instructions during execution of the application program.

33. A client computer comprising:

a processor;

a memory;

a zone module integrated with an operating system of the client computer stored in the memory and executable on the processor; and a plurality of network zones supported by the zone module each of which includes a set of network properties and policies to assign networks encountered by the client computer to one of the plurality of network zones, wherein the processor is configured to execute instructions in the memory to cause the zone module to:

assign a network connected to the computer to a network zone when the network corresponds to the set of properties and policies for the network zone; and receive a zone preference from an application and control communication between the network and the application according to the zone preference by at least preventing the application from communicating with networks connected to the client computer that are not associated with the network zone, the communication between the network and the application being controlled by a least limiting network contact for the application to communications with specific network locations on the network that are specified in the zone preference received from the application, the application being prevented from communicating with network locations on the network that are not specified in the zone preference.

34. A client computer as recited in claim 33, wherein the zone preference:

identifies one or more preferred network zones including a custom zone; and includes instructions defining the set of properties and policies for the custom zone; and wherein the zone module is configured to permit communication between the application and networks assigned to the one or more preferred network zones.

35. A mobile computer comprising:

one or more processors configured to execute instructions stored in a memory associated with the mobile computer;

a zone module configured to, responsive to execution by the one or more processors:

define a plurality of network zones; and based on properties and policies included with each network zone, assign a network to which the mobile computer is connected to one or more of the plurality of network zones;

a zone preference received by the zone module from an application program; and a preferred network zone of the plurality of network zones specified by the zone preference;

wherein the zone module is further configured to:
prevent communication between the application program and any network connected to the mobile computer that is not assigned to the preferred network zone; and limit network contact for the application program to communications with specific network locations on the network that are specified in the zone preference received from the application program, the application program being prevented from communicating with network locations on the network that are not specified in the zone preference.

36. A mobile computer as recited in claim 35, further comprising:
a plurality of network connections, each network connection assigned by the zone module to a distinct network zone of the plurality of network zones.

37. A mobile computer as recited in claim 36, wherein the preferred network zone is a custom zone, and the zone preference comprises instructions defining communication policies for the application program.

38. A client computer comprising:
one or more processors; and
a memory having instructions that are executable by the one or more processors to implement a zone module that is configured to:
define within an operating system of the client computer a plurality of network zones each of which includes a set of network properties and policies to associate networks encountered by the client computer with the plurality of network zones plurality of network zones;
connect the client computer to at least one of the encountered networks;
after connecting to the at least one of the encountered networks, assign the at least one of the encountered networks to one of the plurality of network zones that has network properties corresponding to properties of the at least one of the encountered networks;
receive, from an application program executed at the client computer, a preference that specifies a preferred network zone of the plurality of network zones;
permit communications between the application program and a network connected to the client computer that is assigned to the preferred network zone, the application program being permitted to communicate with specific network locations on the network that are defined by the instructions in the preference received from the application program; and
prevent communications between the application program and a network connected to the client computer that is not assigned to the preferred network zone, the application program being prevented from communicating with network locations on the network that are not specified in the preferred network zone.

39. A client computer as recited in claim 38, wherein the zone module is further configured to:
detect an additional network available to the client computer; and
assign the additional network to an additional network zone of the plurality of network zones.

40. A client computer as recited in claim 39, wherein the zone module is further configured to:
compare network properties of the additional network with properties of each network zone; and assign the additional network to the preferred network zone based on the comparison.

41. A client computer as recited in claim 39, wherein the zone module is further configured to:
connect to the additional network;
determine network properties of the additional network; and
assign the network to the additional network zone based on the network properties.

42. A client computer as recited in claim 38, wherein the zone module is further configured to associate the application program with the preferred network zone.

43. A client computer as recited in claim 38, wherein the zone module is further configured to initiate an installation of the application program.

44. A client computer as recited in claim 38, wherein the zone module is further configured to:
allow the application program to accept a communication from the network connected to the client computer that is assigned to the preferred network zone; and
allow the application program to initiate a communication to the network connected to the client computer that is assigned to the preferred network zone.

45. A client computer as recited in claim 38, wherein the zone module is further configured to:
prevent the application program from accepting a communication from the network connected to the client computer that is not assigned to the preferred network zone; and
prevent the application program from initiating a communication to the network connected to the client computer that is not assigned to the preferred network zone.

46. A mobile computer comprising:
one or more processors; and
a memory having instructions that are executable by the one or more processors to implement a zone module that is configured to:
define within an operating system of the mobile computer a plurality of network zones each of which includes a set of network properties and policies to associate networks encountered by the mobile computer with the plurality of network zones;
recognize a connection between the mobile computer and a first network;
assign the first network to a first network zone in response to the connection being recognized between the mobile computer and the first network;
permit access to the first network for application programs that specify the first network zone as a preferred network zone, the application programs being permitted to communicate with network locations on the first network that are specified in the first network zone;
prevent the application programs from communicating with one or more network locations on the first network that are not specified in the first network zone; and
prevent access to the first network connected to the mobile computer for application programs that specify a second network zone as a preferred network zone.

47. A mobile computer as recited in claim 46, wherein the zone module is further configured to:
determine network properties of the first network; and
assign the first network to the custom zone based on the network properties.

48. A mobile computer as recited in claim 46, wherein the zone module is further configured to:
- recognize a connection between the mobile computer and a second network;
- assign the second network to the second network zone;
- permit access to the second network for application programs that specify the second network zone as a preferred network zone; and
- prevent access to the second network for application programs that specify the first network zone as a preferred network zone.

49. A mobile computer as recited in claim 48, wherein the zone module is further configured to:
- permit access to the first network and the second network for application programs that specify the first network zone and the second network zone as preferred network zones.

50. A client computer comprising:
- one or more processors; and
- a memory having instructions that are executable by the one or more processors to implement a zone module that is configured to:
  - define within an operating system of the client computer a plurality of network zones such that each network zone corresponds to a different network connection policy and includes a set of network properties to associate networks encountered by the client computer with the plurality of network zones;
  - connect the client computer to at least one encountered network;
  - responsive to the connecting, assign the at least one encountered network to one of the plurality of network zones that has network properties corresponding to properties of the at least one encountered network;
  - receive a network zone preference from an application program indicating a preferred network connection policy for the application program; and
  - based upon the network connection policy and network properties of each network zone, enforce the preferred network connection policy according to the network zone preference during execution of the application program to control communications between the application program and networks to which the computer is connected, the communications of the application program being controlled by at least preventing the application program from communicating with networks connected to the client computer that are not associated with a network zone corresponding to the network zone preference, the communications being further controlled by at least:
    - limiting network contact for the application to communications with particular network locations on the at least one network that are expressed in the preferred network connection policy received from the application program; and
    - preventing the application program from communicating with network locations on the at least one network that are not specified in the zone preference.

51. A client computer as recited in claim 50, wherein the preferred network connection policy is a custom network connection policy, the zone module further configured to:
- receive instructions from the application program that define the custom network connection policy; and
- enforce the custom network connection policy according to the instructions during execution of the application program.

* * * * *